J. B. WARING.
DENTIST'S CHAIR.

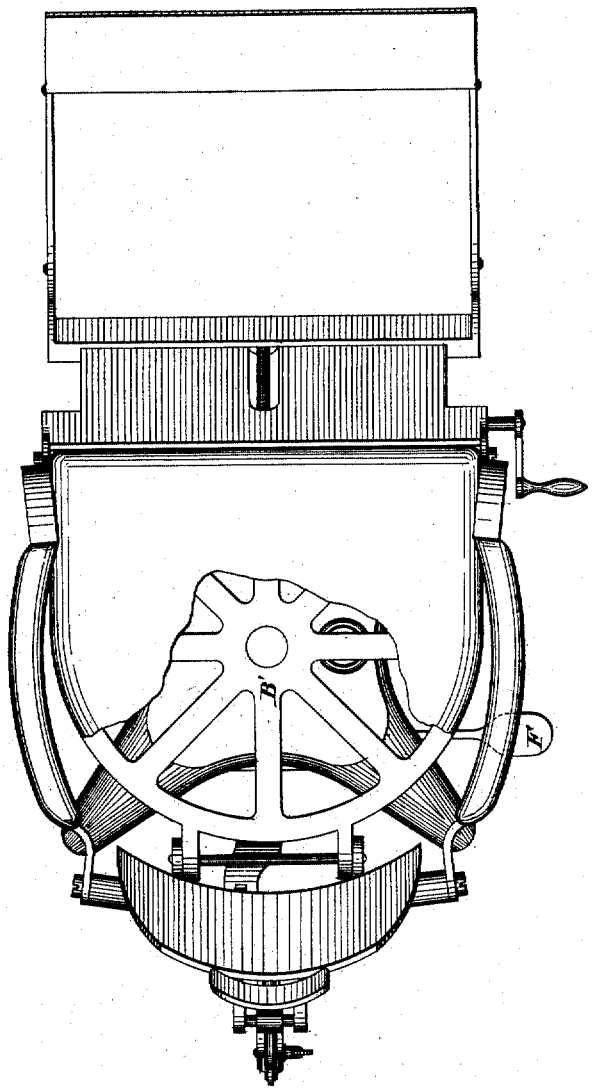

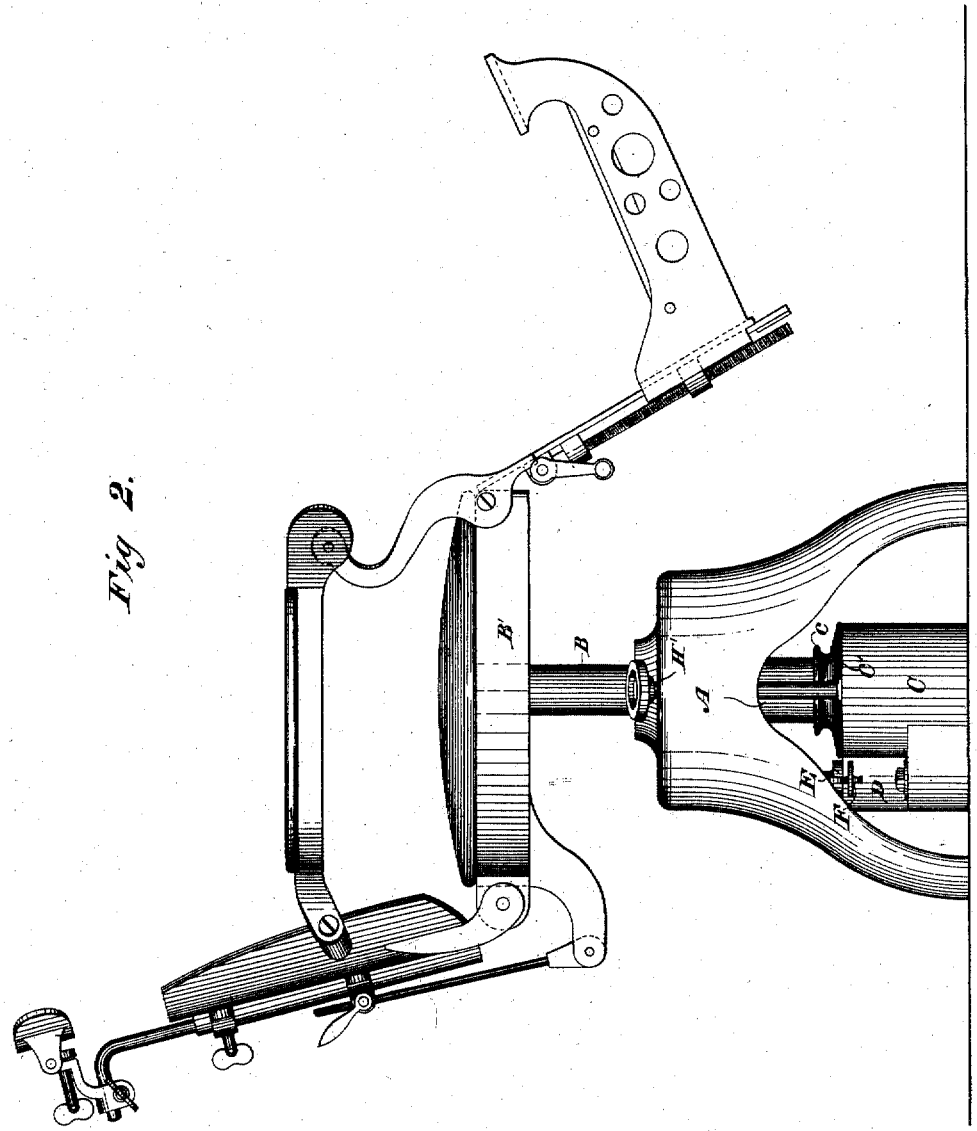

No. 300,538. Patented June 17, 1884.

WITNESSES
Wm. A. Skinkle
Geo. W. Breck.

INVENTOR
John B Waring,
By his Attorneys,
Baldwin, Hopkins & Peyton

J. B. WARING.
DENTIST'S CHAIR.
No. 300,538. Patented June 17, 1884.
Fig 5.
Fig 6.
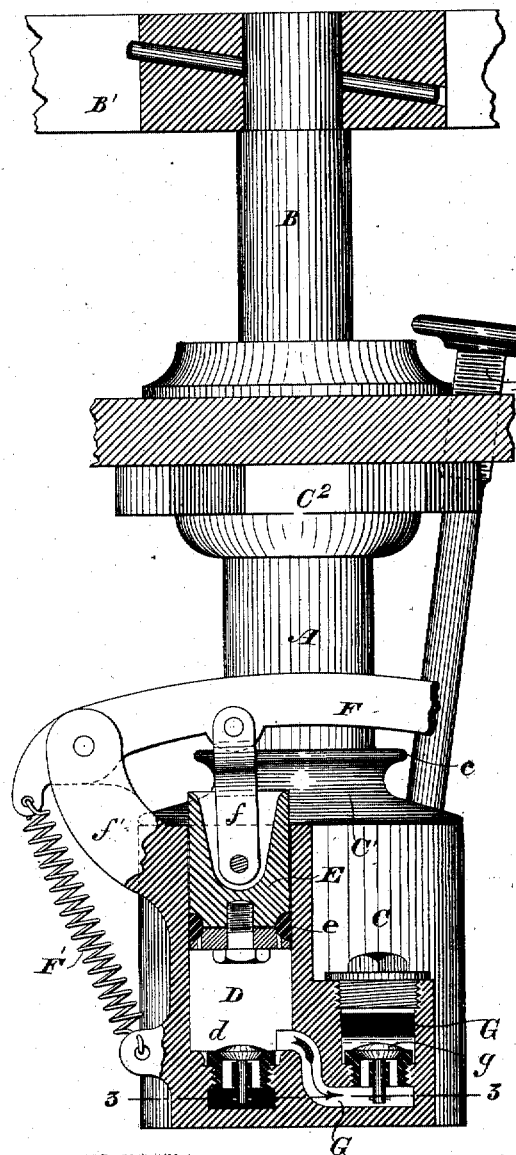
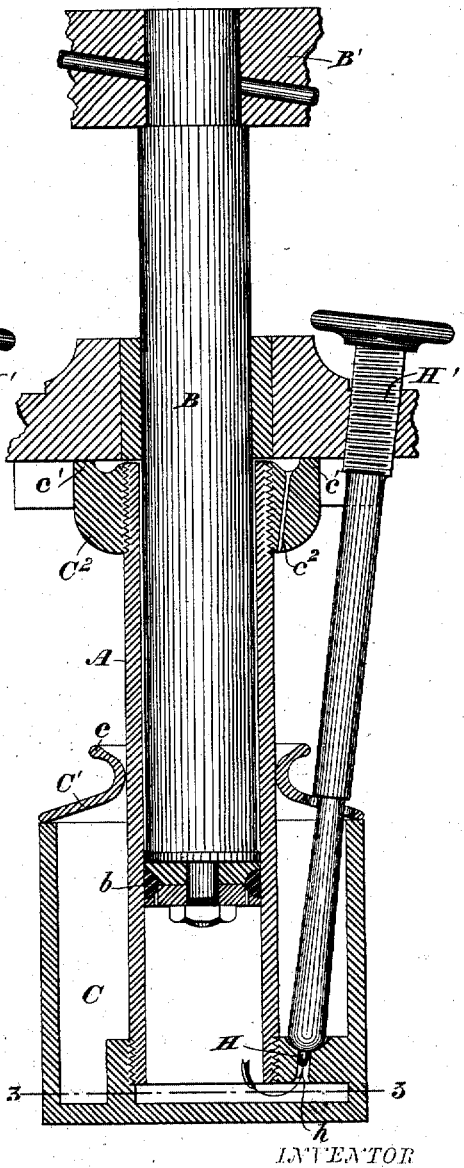
WITNESSES
Wm A Skinkle
Geo W Breek
INVENTOR
John B Waring
By his Attorneys,
Baldwin, Hopkins & Peyton

J. B. WARING.
DENTIST'S CHAIR.

No. 300,538. Patented June 17, 1884.

6 Sheets—Sheet 5.

WITNESSES
Wm. A. Skinkle
Geo. W. Breck

INVENTOR
John B. Waring,
By his Attorneys
Baldwin, Hopkins & Peyton

J. B. WARING.
DENTIST'S CHAIR.

No. 300,538. Patented June 17, 1884.

6 Sheets—Sheet 6.

WITNESSES
Wm A Skinkle
Geo W Breck

INVENTOR
John B Waring.
By his Attorneys.
Baldwin Hopkins & Peyton

UNITED STATES PATENT OFFICE.

JOHN B. WARING, OF NEW YORK, N. Y., ASSIGNOR TO J. CLARENCE WHITE, JOSHUA H. MORRIS, WILLIAM S. HAGANY, AND SAMUEL S. WHITE, JR., EXECUTORS OF SAMUEL S. WHITE, DECEASED.

DENTIST'S CHAIR.

SPECIFICATION forming part of Letters Patent No. 300,538, dated June 17, 1884.

Application filed January 2, 1878. Patented in England January 8, 1878, No. 109.

*To all whom it may concern:*

Be it known that I, JOHN B. WARING, of the city, county, and State of New York, have invented certain new and useful Improvements in Dentists' Chairs, of which the following is a specification.

My invention relates to a dental chair which embodies a fluid column acting on the plunger which carries the chair-body, to cushion and support it, whereby the chair is automatically retained in any position to which it may be elevated by the fluid column, which follows the plunger in its ascent, and the descent of the chair rendered easy, noiseless, and without fatigue to the operator by the gradual displacement of the fluid as the plunger descends.

My invention constitutes an improvement upon the invention shown and described in Letters Patent of the United States granted to Bramble and Deihl, March 31, 1868, as No. 76,044, for piano-stools. The invention of Bramble and Deihl consists in the application of the principle of hydrostatics (or, in other words, of a fluid supporting-column) to the adjustment and support of a seat, and, further, in the adjustment or elevation of a seat by means of a foot-lever.

The objects of my invention are to adapt the fluid supporting-column of Bramble and Deihl to dentists' chairs in such manner as to avoid interference with the adjustability of the chair-body, to improve and render more convenient for operation the devices for elevating and lowering the chair-body, and to prevent the escape of fluid to the outside of the chair-base.

The subject-matter claimed hereinafter specifically will be designated.

Figure 4:
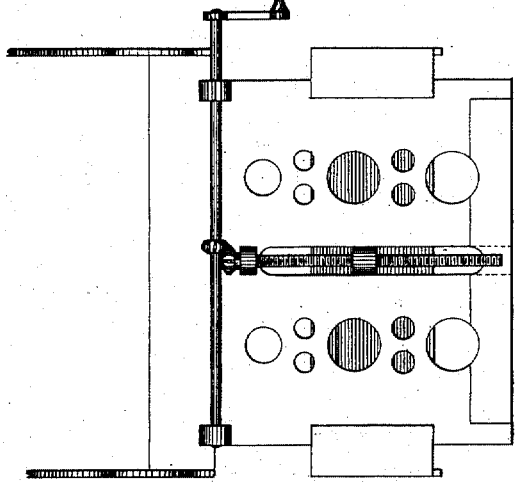
Figure 3:
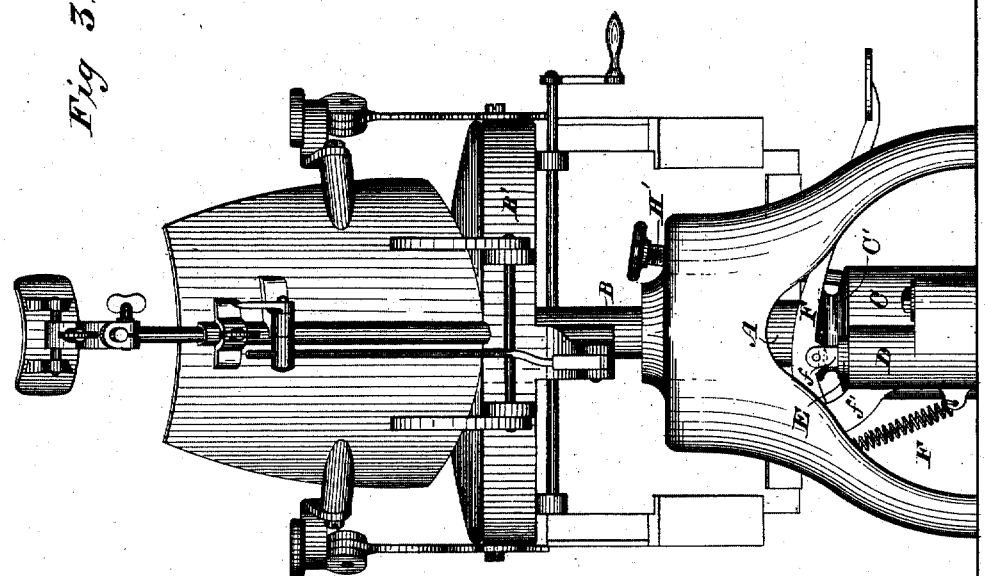
Figure 7:
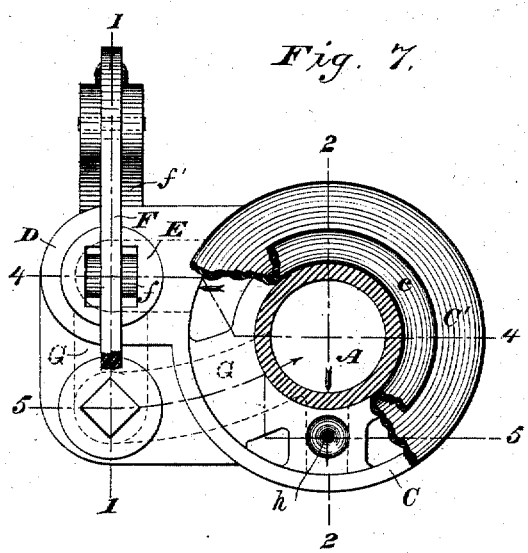
Figure 8:
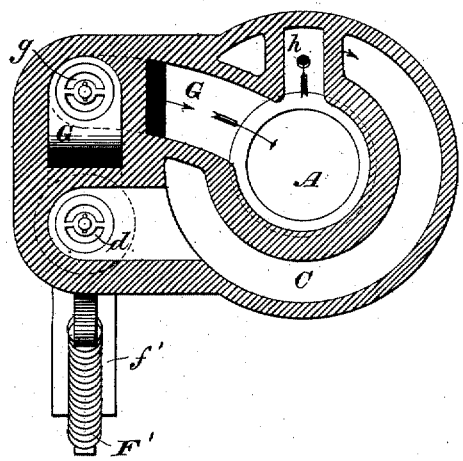
Figure 9:
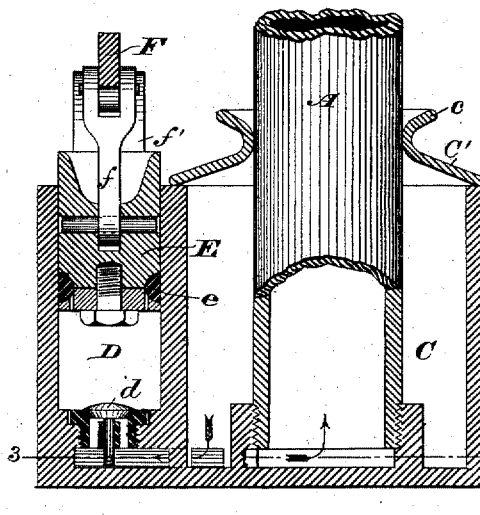
Figure 10:
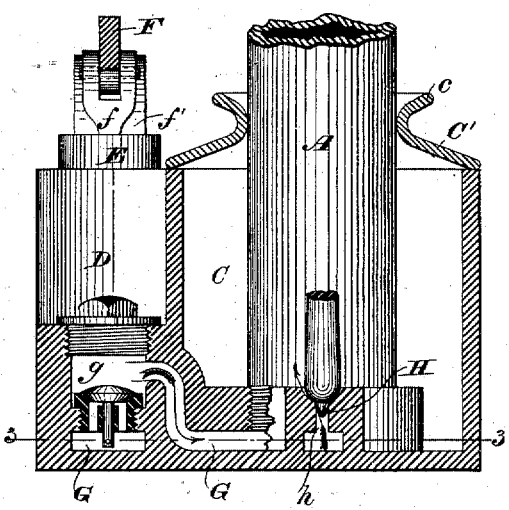
Figure 11:
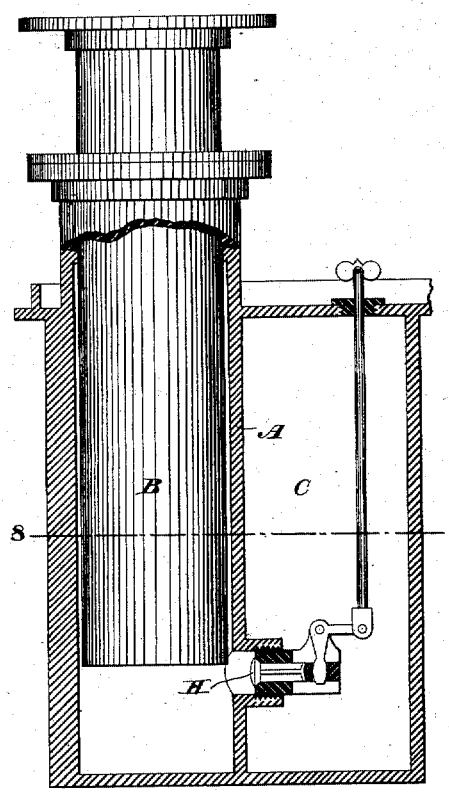
Figure 12:
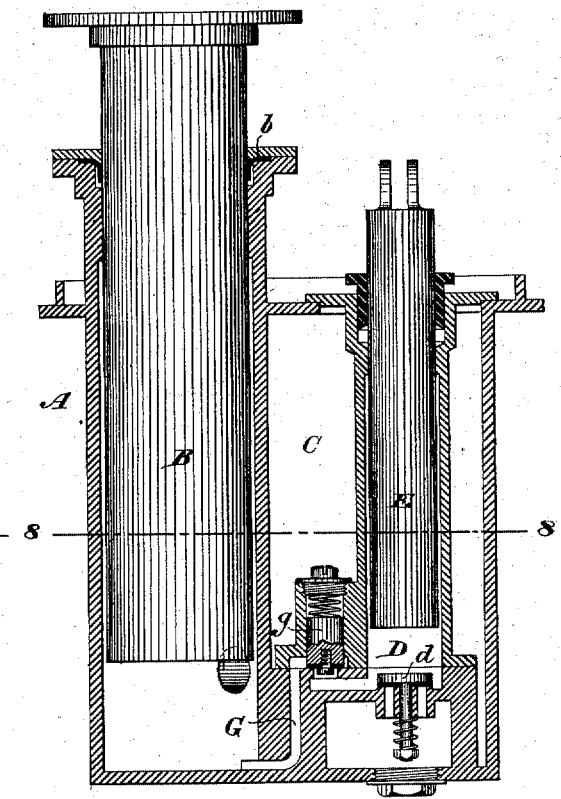

In the accompanying drawings, which represent my improved dental chair as constructed in the best way now known to me, Figure 1 is a plan or top view, portions of the upholstering of the chair being removed to show the parts beneath; Fig. 2, a view in elevation of one side of the chair; Fig. 3, a rear elevation thereof; Fig. 4, a rear elevation of the foot-support; Fig. 5, a rear elevation of the elevating apparatus, partly in section on the line 1 1 of Fig. 7; Fig. 6, a vertical section through the same on the line 2 2 of Fig. 7; Fig. 7, a plan or top view of the chair elevating and sustaining mechanism, with a portion of the foot-lever and of the cap of the reservoir broken away. Fig. 8 is a horizontal transverse section therethrough on the line 3 3 of Figs. 5, 6, 9, and 10, looking upward, showing the fluid-passages and valve-connections. Fig. 9 represents a vertical section on the line 4 4 of Fig. 7; Fig. 10, a similar section on the line 5 5 of said figure. Fig. 11 represents a sectional elevation on the line 6 6 of Fig. 13; Fig. 12, a vertical section on the line 7 7 of said figure, and Fig. 13 a horizontal transverse section on the line 8 8 of Figs. 11 and 12.

The three figures last named represent a modified form of the chair lifting and sustaining apparatus.

The chair-body shown in the accompanying drawings is somewhat similar in its general construction to that of the well-known "Harris chair," and is provided with all the necessary adjustments to insure the ease and comfort of patients, and to allow of their being placed in such positions relatively to the operator that his dental operations may be performed with the nicety and skill required in such delicate work.

The inclination of the chair-body or patient may be varied, as will readily be understood by reference to the drawings, and the parts, when inclined or adjusted, may be securely held by a locking-lever arranged at the back of the chair for convenience, in a well-known way. The foot board or rest is also adjustable, in a well-known way, by means of a screw-rod. The construction of the chair-body, however, may be varied in well-known ways, which will readily suggest themselves to those skilled in the art and familiar with the building, constructing, and working of dental and such like chairs.

In Figs. 1 to 10, inclusive, a barrel, cylinder, or chamber, A, is shown as secured to or forming a part of the base of a dental chair, with a plunger, B, (capable of turning and moving freely endwise in said cylinder,) secured upon or forming a part of a seat-frame or chair-body, B', the piston being provided with suitable packing, *b*. The cylinder is surrounded by a reservoir, C, containing glycerine, oil, water, or other well-known equivalent liquid, which cylinder has a cover or cap, C', to prevent the entrance of dirt. The cap C' is provided with an annular flange, $c$, and a cap, $C^2$, on the upper end of the cylinder is provided with a similar flange, $c'$, and with a duct, passage, or channel, $c^2$, leading from said flange to the outer surface of the cylinder, so that the fluid, if any, which may escape between the piston and the upper part of the cylinder, or may happen to be drawn up through the cylinder, may flow back into the reservoir— in this instance down the outside of the cylinder—through the cap C'. A valve, $d$, of any suitable well-known construction, (in this instance an ordinary puppet-valve,) works in a duct or channel leading from the reservoir C to a cylinder, D, in which a plunger, E, provided with a suitable packing, $e$, works. The plunger E is worked by the foot of the operator to avoid the necessity of stooping, and is in this instance pin-jointed at $f$ to a foot-lever, F, pivoted upon a bracket or lug, $f$, formed upon the casing of the fluid reservoir or cylinder; or it may be pivoted upon the base of the chair, if preferred. This lever is provided with a coiled spring, F', secured to the extreme rear end of the lever, and to a lug or projection on the cylinder, which spring tends to elevate the treadle end of the lever when depressed, after the pressure is removed, and consequently automatically lifts or brings the piston into position for another operation or depression by the foot of the operator during the elevation of the chair. Thus a step-by-step movement is obtained, as in the Bramble and Deihl patent hereinbefore mentioned, and I find a coiled spring arranged as shown to be preferable to a flat spring arranged as in said patent. The fluid that enters the pump-chamber passes outward therefrom through a channel, G, provided with a suitable valve, $g$, to the cylinder A underneath the piston B. Owing to this mode of construction, if the chair-frame were raised by hand or by any means independent of the pump, the fluid in the reservoir would be drawn or flow through the valves $d$ $g$, above described, into the cylinder A, and would follow the chair body or seat supporting piston B in its ascent, and when this ascent ceases and the weight of the chair rests upon the fluid in the piston the valves will be automatically closed by the back-pressure, whereby the chair will remain in its elevated position without strain on the elevating mechanism by means of the cushioning and sustaining fluid column. To lower the chair I provide a suitable valve, which permits of the escape of the fluid in the chamber A, and the weight upon the chair or seat supporting piston B will cause it gradually to descend to its lowest position, the rate of descent being regulated by the area of the discharge-opening, which may readily be varied by well-known means. In this instance the discharge-opening $h$ is shown as leading from the cylinder to the reservoir C, the opening being closed by a cone-valve, H, operated by a lever, hand-wheel, or screw, H', the shank of which screw extends to within easy reach of the operator. I thus have two distinct mechanisms— one for elevating and another for lowering the chair—to be operated outside the base or stand, which is more convenient and permits of a better operation of a dental chair than the single mechanism (the foot-lever) for both elevating and lowering the piano-stool, as in Bramble and Deihl's patent, although for a piano-stool their organization is probably the best.

Figure 13:
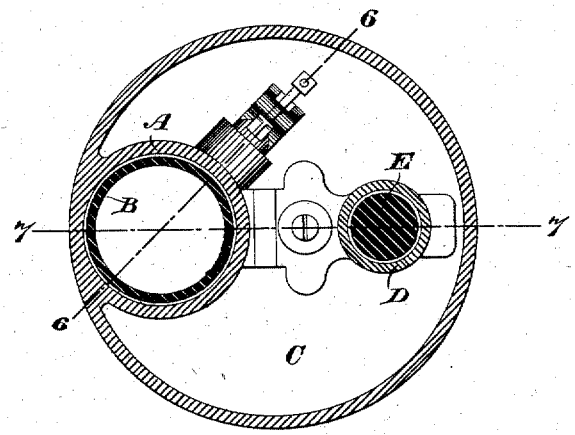

I have also contemplated the application to a chair embodying a fluid sustaining and cushioning column of a valve opening inward against the pressure of the fluid and connected with a suitable lever, so that the operator could with his hand or foot open the valve against said pressure to permit of the escape of the fluid, such a valve possessing the advantage of closing automatically the moment it is released by the operator, as in said Bramble and Deihl's patent. Figs. 11, 12, and 13 show this modification, in which C represents a large cylindrical reservoir, A a cylinder inclosed therein, and B a chair or seat supporting plunger. The sustaining and cushioning fluid passes from the reservoir into the chamber D, provided with a plunger, E, through a spring-valve, $d$, and is expelled through a channel, G, and spring-valve $g$ into the cylinder A, the cylinder being provided with a discharge-valve, H, opening inwardly, operated by a link and bell-crank lever, and automatically closed by the pressure of the fluid, as hereinbefore alluded to.

The operation of my improved dental chair, from what has been said, will readily be understood. When the operator depresses the lever with his foot, the fluid is forced from the reservoir through the pump into the cylinder, and elevates the chair, as above described.

It will be noted that as the chair body or seat supporting piston B is capable of turning freely, as well as of moving endwise relative to the cylinder A and chair-base, the chair-body can readily be revolved or adjusted horizontally, and other adjustments, as required, will readily suggest themselves to those skilled in the art. It will thus be seen that the chair is retained in its elevated position, however lifted, by means of the supporting plunger or piston and the fluid column, without interfering with the various adjustments of the chair, while the mechanism is compactly arranged and mounted upon or inclosed within the base. The raising and lowering of the chair is also noiseless and easy.

I have described how the sustaining and cushioning fluid column may be utilized as the medium by which the chair-body and its support is elevated in the manner of a hydraulic jack, as in Bramble and Deihl's patent, and this method of employing the fluid-column possesses many advantages; but, as before explained, the chair may be lifted by hand or otherwise irrespective of hydraulic pressure, and the sustaining fluid column allowed to flow in behind the supporting-plunger to maintain and cushion the chair at any elevation to which it may be adjusted.

The barrel and plunger have been described as cylindrical in shape for convenience of turning; but it is obvious that a plunger barrel or cylinder and plunger of polygonal shape could be employed when it is desired not to turn the chair horizontally; or the cylinder and plunger can be prevented from turning relatively to each other by the well-known spline and feather; or the chair may be prevented from turning in any other equivalent way.

The chair could be made to rotate upon its support, or the piston and cylinder might be made to rotate together in the chair-base.

The foot-lever might be connected directly with the seat-support.

I do not claim a hydraulic jack, such apparatus being old and well known, nor anything shown in the Bramble and Deihl patent. My organization is such as not to interfere with portability and adjustability of a dental chair, while obtaining advantages and capabilities much desired.

What I claim as of my own invention is—

1. The combination, substantially as hereinbefore set forth, of the base, the plunger, the chair-body capable of varying adjustment mounted thereon, the fluid supporting-column, the elevating foot-lever, and the handle or lever H', independent of the elevating foot-lever or elevating mechanism, for operating the valve or mechanism that permits of the escape of the fluid from beneath the plunger to lower the chair, these members being constructed and operating in combination as specified.

2. A chair-body mounted upon a plunger sustained at any desired height by means of a fluid medium, the said chair-body being adapted to be variably inclined, and being provided with means for securing it at any desired angle, substantially as described.

3. The combination, substantially as hereinbefore set forth, of a base or stand, a vertically-movable support, a fluid medium for sustaining said support, a chair-body carried by said support, adapted to be adjusted vertically, horizontally, and as to inclination relatively to the base, and mechanism for accomplishing these adjustments of the chair-body.

In testimony whereof I have hereunto subscribed my name.

J. B. WARING.

Witnesses:
WALTER E. CHAVE,
PHILIP SCHUMACHER.

It is hereby certified that Letters Patent No. 300,538, granted June 17, 1884, upon the application of John B. Waring, of New York, New York, for an improvement in "Dentists' Chairs," was erroneously issued to "J. Clarence White, Joshua H. Morris, W. S. Hagany and Samuel S. White, Jr.," as executors of Samuel S. White, assignee of the entire interest in said invention, now deceased; that the patent should have been granted to *J. Clarence White and Samuel S. White, Jr.*, as sole executors; and that the proper corrections have been made in the files and records pertaining to the case in the Patent Office, and should be read in the Letters Patent to make it conform thereto.

Signed, countersigned, and sealed this 24th day of June, A. D. 1884.

[SEAL.]

M. L. JOSLYN,
*Acting Secretary of the Interior.*

Countersigned:
BENJ. BUTTERWORTH,
*Commissioner of Patents.*